United States Patent [19]

Ehrke et al.

[11] Patent Number: 5,154,876
[45] Date of Patent: Oct. 13, 1992

[54] PROPELLANT ACTUATED NUCLEAR REACTOR STEAM DEPRESSURIZATION VALVE

[75] Inventors: Alan C. Ehrke; John B. Knepp, both of San Jose; George I. Skoda, Santa Clara, all of Calif.

[73] Assignee: General Electric Company, San Jose, Calif.

[21] Appl. No.: 708,160

[22] Filed: May 31, 1991

[51] Int. Cl.$^5$ .............................. G21C 9/00
[52] U.S. Cl. .......................... 376/282; 376/277; 376/283; 137/68.2
[58] Field of Search ............ 376/283, 282, 277; 137/68.2; 29/254, 255

[56] References Cited

U.S. PATENT DOCUMENTS

| | | | |
|---|---|---|---|
| 3,666,616 | 5/1972 | Schluderberg | 376/283 |
| 4,061,535 | 12/1977 | Nolan et al. | 376/283 |
| 4,815,697 | 3/1989 | Skoda | 376/283 |
| 5,028,383 | 7/1991 | Moore | 376/277 |
| 5,085,825 | 2/1992 | Gluntz et al. | 376/282 |

Primary Examiner—Daniel D. Wasil
Attorney, Agent, or Firm—Robert R. Schroeder

[57] ABSTRACT

A nuclear fission reactor combined with a propellant actuated depressurization and/or water injection valve is disclosed. The depressurization valve releases pressure from a water cooled, steam producing nuclear reactor when required to insure the safety of the reactor. Depressurization of the reactor pressure vessel enables gravity feeding of supplementary coolant water through the water injection valve to the reactor pressure vessel to prevent damage to the fuel core.

9 Claims, 2 Drawing Sheets

PROPELLANT ACTUATED NUCLEAR REACTOR STEAM DEPRESSURIZATION VALVE

The Government of the United States has rights in this invention under Contract No., DE-AC03-86SF16563.

FIELD OF THE INVENTION

This invention relates to power generating nuclear fission reactor plants and equipment therefor. The invention is particularly concerned with an improvement in means used for depressurizing steam within the nuclear boiler system of a power generating plant.

Water cooled nuclear fission reactors utilized for electrical power generation require a means to rapidly reduce high steam pressures within the system, through venting, to permit auxiliary low pressure system to provide continuous makeup flow in the event high pressure systems are no longer available. Advanced nuclear reactor plants, currently being designed, contemplate the use of "depressurization valves" to rapidly reduce the pressure within the reactor vessel. Once opened, such valves have the unique feature of remaining open down to zero pressure without any further operator action and without need to provide power to maintain the valve in its open position. Typically, the nature of the steam producing unit will determine the design requirements for such depressurizing valves. This is especially so in the nuclear reactor field due to the distinctive conditions encountered with nuclear fission and the stringent safety requirements imposed in this industry, among other reasons.

BACKGROUND OF THE INVENTION

A unique aspect of nuclear reactors, and a foremost safety consideration, is the inherent presence of radiation and radioactive materials. This highly significant condition requires the most strict design and safety conditions with respect to many components and functions of a nuclear reactor plant and imposes numerous requirements in operating and maintaining nuclear plants. For example, reactor components and related equipment which become significantly radioactive in service generally must be capable of long term, trouble free and positive functions, as well as being amenable to operation and maintenance by personnel in remote locations.

Steam depressurization and/or pressure relief and/or water injection valves are especially critical devices in any type of high pressure hot water and/or steam producing units, and when employed in a nuclear reactor plant the highest standards and demands must be applied to design and fabrication of such valves.

Various valve designs and operating modes have been proposed and considered in an effort to meet the stringent demands for such steam depressurization and water injection valves. The depressurization valves for the advanced reactor designs have greater reliability and enhanced maintenance/performance characteristics compared to existing valve designs.

SUMMARY OF THE INVENTION

This invention comprises new combination of a nuclear reactor and a new steam depressurization valve and/or water injection valve for service in power generating, water cooled nuclear fission reactor plants including their pressure retaining enclosures comprising the reactor vessel and associated conduits. The valve of this invention, which will meet the requirements for nuclear reactor service, is maintained in the closed position during normal operation and can be controlled from outside the reactor containment and thus beyond any source of radiation. The valve opens to permit depressurization and water injection when a propellant material is ignited by an electrical signal.

OBJECTS OF THE INVENTION

It is a primary object of this invention to provide a new combination of steam depressurization valve and/or water injection valve with a nuclear fission reactor plant.

It is also an object of this invention to provide a mechanically simple, reliable and leaktight valve for steam depressurization and/or water injection valve combined with a nuclear fission reactor plant.

It is a further object of this invention to provide a steam depressurization valve and/or water injection valve in a nuclear reactor plant which is maintained in its normally closed position such that the valve can be opened to its pressure relieving or water injection position simply by igniting a propellant material.

It is a still further object of this invention to provide a nuclear reactor plant incorporating a steam depressurization valve and/or water injection valve wherein control of the actuating means for opening the valve can be located outside the reactor plant safety containment.

DETAILED DESCRIPTION OF THE INVENTION

Figure 1:
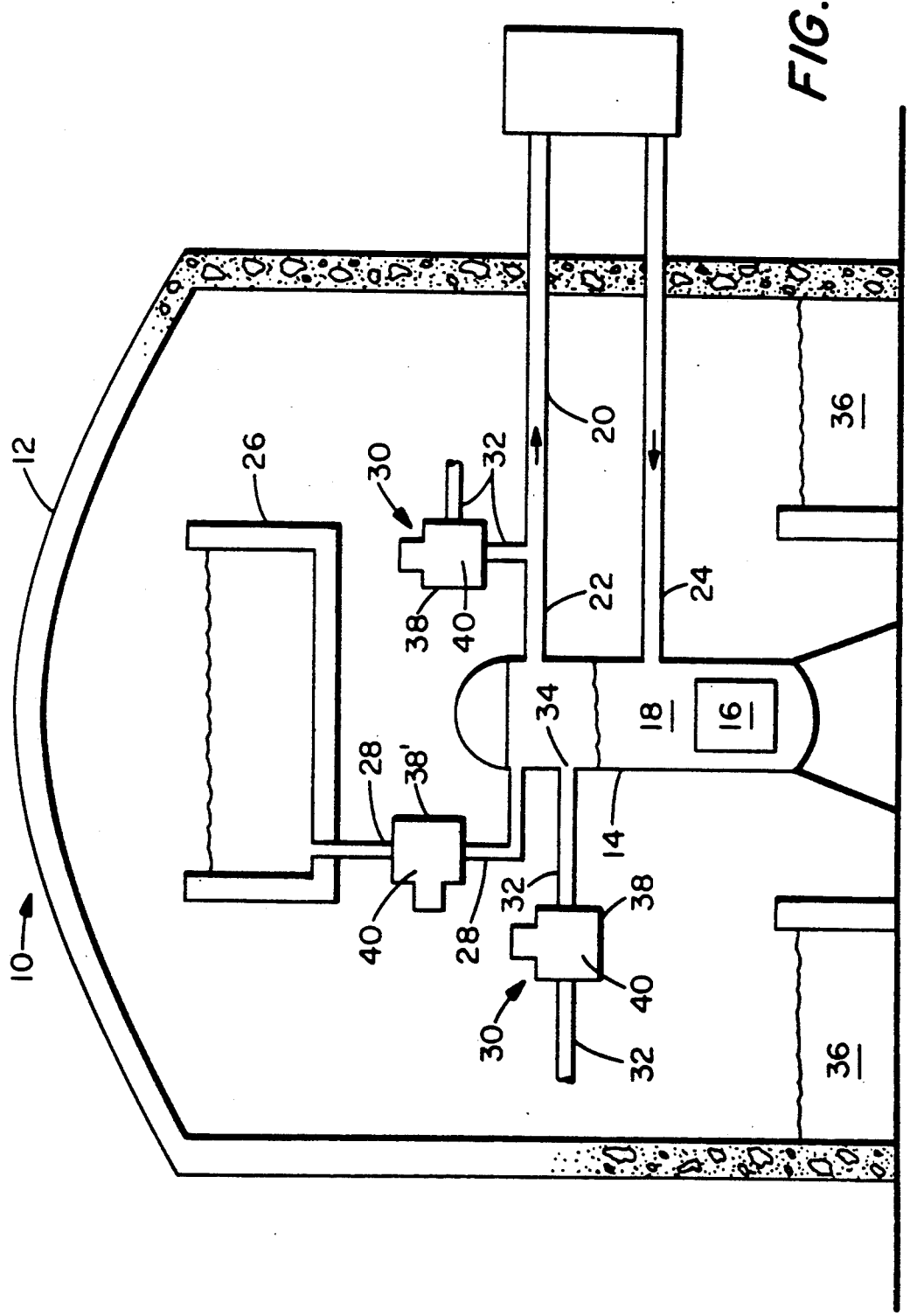
FIG. 1 is a schematic illustration of a nuclear fission reactor plant.

Referring to the drawings, in particular FIG. 1, a typical water cooled, steam producing nuclear fission reactor plant 10 comprises a containment structure 12 for enclosing and sealing in radiation and radioactive materials from the outer environment. Enclosed within the safety containment 12 is the reactor pressure vessel 14 containing the core of heat producing fissionable fuel 16 and water coolant 18 which comprises the source of steam for turbine operation. A steam/condensate coolant water loop 20 is comprised of a steam outlet pipe 22 for conducting the generated steam to its location of use, such as a turbine, and condensate water return inlet pipe 24 recycles the condensed steam back to the reactor pressure vessel 14 as coolant water for reuse. The reactor pressure vessel and associated tanks and conduits including the steam/condensate coolant water loop comprise a pressure retaining enclosure.

For the advanced nuclear fission reactor plants currently being designed, an auxiliary coolant water system is provided such as the gravity feed arrangement shown in FIG. 1. For instance, an auxiliary coolant water tank 26 is positioned at an elevated level within the containment structure 12 of the nuclear reactor plant 10 to provide for gravity flow or supply of auxiliary coolant water through a gravity feed conduit 28 and through a propellant actuated valve 38' into the reactor pressure vessel 14.

Such an auxiliary coolant water system is designed to provide a supply of supplementary coolant water for replacing any significant losses of coolant water from the reactor pressure vessel 14 and its contained fuel core 16 caused by a major breach of coolant water carrying conduits such as the steam/coolant loop 20. However, reactor operating temperatures and pressures preclude gravity feed of coolant water into the reactor pressure vessel 14.

Due to the inherent high operating pressures within nuclear reactor pressure vessels, including all pressure retaining enclosures associated therewith, reactor pressure vessel depressurizing measures are required to assure the safety of the advanced plants.

In accordance with this invention, a unique combination of a water cooled and moderated, boiling water nuclear reactor plant and a propellant actuated depressurization valve provides for the venting of high pressure steam from the pressure vessel and/or rapid injection of cooling water into the reactor vessel of such plants. The depressurization system 30 of the combination of this invention includes a pressure releasing conduit 32 extending from a nozzle 34 in the pressure vessel 14, or from a significant conduit such as the steam/coolant loop 20 in fluid communication with the pressure vessel.

Figure 2:
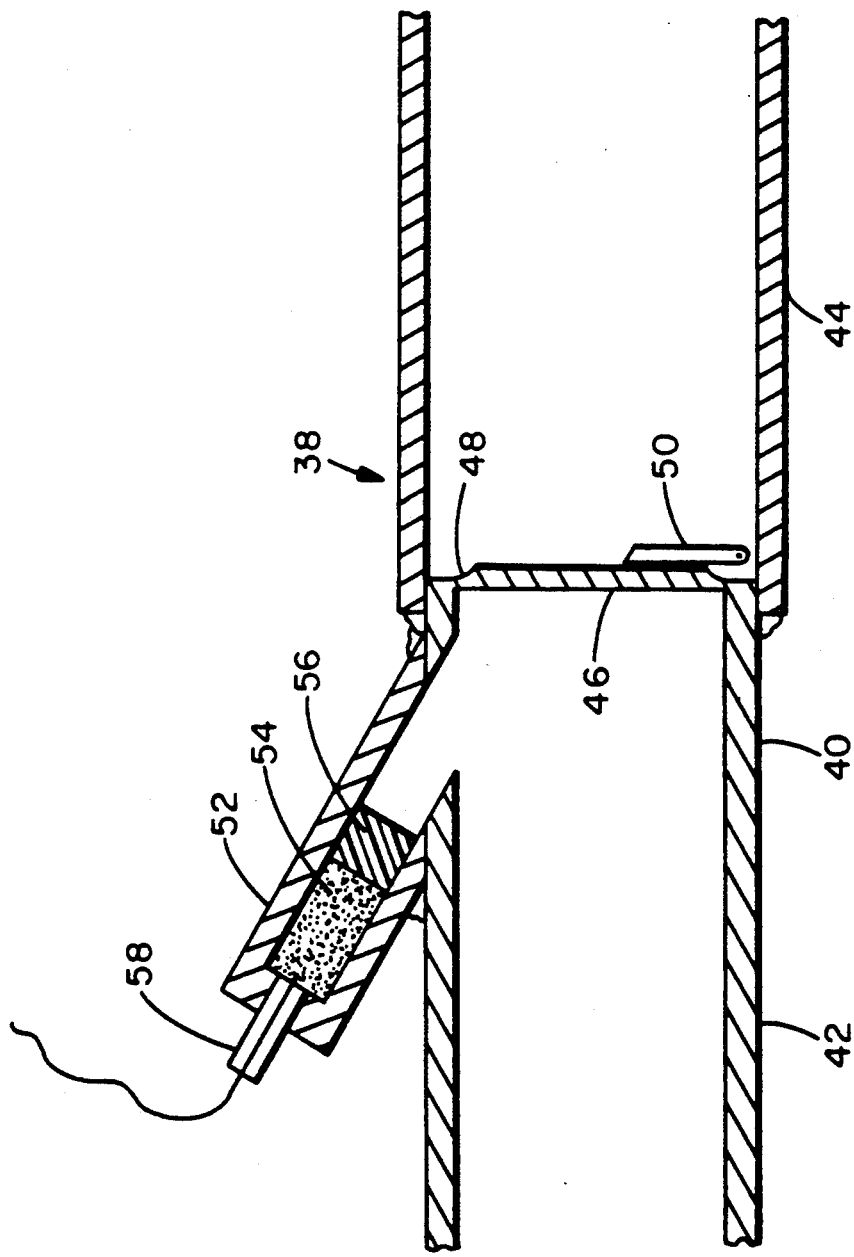
FIG. 2 is an elevation view, partly in crosssection, illustrating the construction and mode of operation of a nuclear reactor propellant actuated depressurization valve of this invention in the normally closed position.

Flow through the pressure releasing conduit 32 for venting pressure from the reactor pressure vessel 14 is controlled by a propellant actuated depressurization valve 38. Depressurization or water injection valve 38, such as illustrated in FIG. 2, is comprised of a housing 40 which can comprise a pair of joined conduit sections providing a valve controlled potential fluid flow path therethrough, namely an upstream section 42 and a downstream section 44 which incorporate a valve means therein. A diaphragm valve member 46, or fluid seal, is located within the fluid flow path provided by adjoined sections 42 and 44 of housing 40, blocking off all fluid flow therethrough. Diaphragm valve member 46 is formed integral with a conduit section such as 42, or a sleeve section inserted and secured within the flow path provided by section 42 or 44.

The fluid flow blocking diaphragm valve member 46 can be machined from a single body of metal forming both a portion of the conduit section such as 42, or a sleeve affixed therein, or united by integrally adjoining a composite of a diaphragm valve member 46 to such a component by welding. In any case, a portion of reduced thickness or crosssection extending around the periphery defining the diaphragm valve member 46 is provided to form a shear section 48 which when subjected to a sudden impact such as that resulting from a propellant driven piston, will fracture and separate the diaphragm valve member 46 section from the other portion. When so separated the disconnected diaphragm valve member 46 will be further dislodged by the high pressure steam from the reactor pressure vessel 14 through the upstream section 42 of the pressure releasing conduit 32, and/or simply the effects of gravity upon the then unsupported valve member 46. Pivoting means 50, such as a hinge-like member, can be provided to enable the pivoted opening of the separated diaphragm valve member 46 without it being carried away by the impact of released fluid pressure through the pressure releasing conduit 32 from the reactor pressure vessel 14 upon its opening by fracturing the shear section 48.

Opening of the depressurization or water injection valve 38, which under normal operating conditions is closed to all flow or any leakage due to the integral diaphragm valve member 46 sealing off the pressure releasing conduit 32, is achieved by means of applying a sudden high velocity impact, such as the impact force produced by a propellant driven piston.

As shown in FIG. 2 of the drawing, a ballistics chamber 52 can be provided adjoined to a component of the valve, such as upstream section 42 with the open discharge aptly directed at the diaphragm valve member 46. The ballistics chamber 52 is loaded with a suitable propellant material 54 and sealed therein with a retaining device 56 such as a piston. Detonation of the propellant 54 abruptly and forcefully accelerates the piston which impacts upon the integral diaphragm valve member 46, fracturing the encircling thin area of the shear section 48 thereby breaking free the diaphragm valve member 46 from its adjoining component, thereby opening the propellant actuated depressurization valve 38. Thus, fluid flow comprising high pressure steam is permitted to rapidly escape from the reactor pressure vessel 14 through the pressure releasing conduit 32.

A suitable electrical ignition means 58, such as a spark plug or other electrical discharge device, with a detonator, can be used to actuate the propellant material directing a forceful high velocity impact device against the diaphragm valve member 46 for dislodging same to open the valve 38.

Upon actuating the normally closed propellant actuated depressurization or water injection valve 38 and as a result thereof, the depressurizing of the reactor pressure vessel 14, supplementary coolant water can be fed by gravity flow from the overhead auxiliary coolant water supply 26 through gravity feed conduit 28 and a water injection valve 38' into the reactor pressure vessel 14 to make up for any coolant water loss due to a breach of the system, or otherwise.

The system of this invention comprising the combination of a power generating nuclear reactor plant with a propellant actuated depressurization and/or water injection valve, provides a high degree of reliability and rapid depressurization of the reactor pressure vessel whereupon a gravity driven coolant water feed arrangement is possible, effective and practical, as well as precluding any pressure or fluid leakage from the pressure vessel until the valve is actuated, whereupon the valve thereafter remains open to prevent a possible subsequent pressure buildup. Moreover this arrangement does not require a continuous power source, only a momentary electrical signal to initiate the depressurization of the reactor system.

What is claimed is:

1. A nuclear fission reactor plant having a depressurization and/or water injection system comprising the combination including:

a nuclear reactor pressure vessel containing a heat producing core of fissionable nuclear fuel material and coolant water for submerging the heat producing fuel core and circulating through the pressure vessel to produce steam and transfer heat energy away from the fuel core, said reactor pressure vessel having a steam/coolant loop comprising a steam outlet from the pressure vessel for supplying produced steam to perform work, and a condensed coolant water inlet for returning coolant water from expended and condensed steam to the reactor pressure vessel; and, a nuclear reactor pressure vessel depressurization system comprising a pressure releasing conduit extending from an exhaust nozzle in the reactor pressure vessel to an open discharge end, and a propellant actuated, fast-acting valve means imposed in the pressure releasing conduit between the reactor pressure vessel nozzle and discharge end, said propellant actuated valve means comprising a diaphragm seal for blocking fluid flow through the valve means and a propellant for breaking free the diaphragm seal and thereby enabling fluid flow through the pressure releasing conduit from the reactor pressure vessel, therein depressurizing the reactor pressure vessel, and comprising a water injection conduit extending from a water supply to the reactor vessel and a propellant actuated valve imposed in the water injection conduit.

2. The nuclear fission reactor plant of claim 1, wherein the propellant is electrically detonated.

3. The nuclear fission reactor plant of claim 1, wherein the leak-proof diaphragm seal is provided with reduced area shear section for facilitating its breaking free and removal by the propellant.

4. The nuclear fission reactor plant of claim 1, wherein the plant comprises a gravity feed supplementary supply of coolant water for introduction into the nuclear reactor pressure vessel through a propellant actuated valve following depressurization.

5. A nuclear fission reactor plant having a depressurization system comprising the combination including:

a nuclear reactor pressure vessel housed within a containment structure and containing a heat producing core of fissionable nuclear fuel material and coolant water for submerging the heat producing fuel core and circulating through the pressure vessel to produce steam and to transfer heat energy away from the fuel core, said reactor pressure vessel having a steam/coolant loop comprising a steam outlet from the pressure vessel for supplying steam to perform work, and a condensed coolant water inlet for returning coolant water from expended and condensed steam to the reactor pressure vessel; and, a water cooled nuclear fission reactor pressure vessel depressurization system comprising a pressure releasing conduit extending from an exhaust nozzle in the nuclear reactor pressure vessel or from the steam/coolant loop to an open discharge end, and a propellant actuated fast-acting valve means imposed in the pressure releasing conduit said propellant actuated valve means comprising a diaphragm seal integrally joined with a component of the valve means for blocking fluid flow through the valve means, said diaphragm seal having an encircling portion of reduced thickness providing a shear section around the periphery of the diaphragm seal and a propellant for breaking free the diaphragm seal about the shear section and thereby enabling fluid flow through the pressure releasing conduit from the reactor pressure vessel.

6. The nuclear fission reactor plant of claim 5, wherein the propellant is electrically detonated.

7. The nuclear fission reactor plant of claim 5, wherein the plant comprises a gravity feed supplementary supply of coolant water for introduction into the nuclear reactor pressure vessel through a propellant actuated valve.

8. The nuclear fission reactor plant of claim 5, wherein the pressure releasing conduit terminates with an outlet discharging within the containment structure.

9. The nuclear fission reactor plant of claim 5, wherein the diaphragm seal is secured to a pivoting means.

* * * * *